United States Patent [19]
Hofmann et al.

[11] Patent Number: 4,713,180
[45] Date of Patent: Dec. 15, 1987

[54] CERAMIC FILTER AND METHOD FOR USING SAME

[75] Inventors: Franz Hofmann, Neuhausen; Hans G. Trapp, Schaffhausen, both of Switzerland; Rolf Rietzscher, Mettmann, Fed. Rep. of Germany; Jürgen Otto, Hattingen, Fed. Rep. of Germany; Wolfgang Kaettlitz; Gerd Trinki, both of Borken, Fed. Rep. of Germany

[73] Assignee: Georg Fischer Aktiengesellschaft, Schaffhausen, Switzerland

[21] Appl. No.: 701,135

[22] Filed: Feb. 13, 1985

[30] Foreign Application Priority Data

Feb. 15, 1985 [CH] Switzerland ............... 731/84

[51] Int. Cl.$^4$ ............... B01D 29/32
[52] U.S. Cl. ............... 210/773; 55/487; 55/523; 75/24; 75/45; 210/484; 210/510.1; 266/227
[58] Field of Search ............... 55/484, 486, 487, 523; 75/24, 45; 266/227; 210/510.1, 773, 484, 488, 489, 490

[56] References Cited

U.S. PATENT DOCUMENTS

| | | | |
|---|---|---|---|
| 3,893,917 | 7/1975 | Pryor et al. | 210/510.1 X |
| 4,081,371 | 3/1978 | Yarwood et al. | 210/510.1 X |
| 4,265,659 | 5/1981 | Blome | 210/510.1 X |
| 4,334,990 | 8/1982 | duManoir de Juaye et al. | 210/510.1 X |
| 4,343,704 | 8/1982 | Brockmeyer | 210/510.1 X |
| 4,394,271 | 7/1983 | Groteke | 210/773 |
| 4,413,813 | 11/1983 | Pryor | 266/227 X |
| 4,494,985 | 1/1985 | Butler et al. | 75/68 R X |
| 4,504,392 | 3/1985 | Groteke | 210/510.1 X |

FOREIGN PATENT DOCUMENTS 0029802 6/1981 European Pat. Off. .
82/03339 10/1982 PCT Int'l Appl. .

OTHER PUBLICATIONS

Perry, R. H., Chilton, C. H., Chemical Engineers' Handbook, 5th ed., 1973, p. 5-54.

Primary Examiner—Richard V. Fisher
Assistant Examiner—W. Gary Jones
Attorney, Agent, or Firm—Marmorek, Guttman & Rubenstein

[57] ABSTRACT

A ceramic filter for filtering molten iron is disclosed. The ceramic filter is made from a high-melting ceramic material having an open-celled foam structure, a variable bulk density in different portions of the filter, and at least one afflux surface. In order to filter molten iron efficiently, the ratio of filter surface to filter volume should be in the range of about 0.0003 to 9 m$^2$/cm$^3$, the specific filter resistance should be in the range of about 0.1 to 0.9 bar-cm at a flow rate of 5 m$^3$/hour, and the pressure loss $\Delta p$ across the filter should depend on the specific resistance $\rho$, the filter length, and the surface area of the afflux plane F in accordance with the relationship:

$$\Delta p \alpha \rho \times \frac{L}{F}.$$

A method for filtering molten iron using this ceramic filter is also disclosed. In this method, the ceramic filter is located near the point in the casting system where the molten iron has its greatest kinetic energy. The molten iron is first caused to flow tangentially by the afflux plane of the ceramic filter and then is deflected to create turbulence directly before the afflux plane of the filter.

18 Claims, 8 Drawing Figures

CERAMIC FILTER AND METHOD FOR USING SAME

BACKGROUND OF THE INVENTION

The instant invention relates to a ceramic filter with an open-celled foam structure having at least one afflux plane for filtering molten metals.

Filtration of metallic melts with ceramic foam filters is generally known in the field of non-iron metals. Particularly in the production of semifinished materials, a high degree of purity is necessary since layers of very small thickness are produced in the succeeding operational steps. Therefore, solid or molten impurities must be removed from the melt during production since they would otherwise lead to a considerable deterioration in quality. In this connection, ceramic filters, especially those based upon foam structures, have been successfully used for several years.

For example, U.S. Pat. Nos. 3,893,917; 4,265,659; and 4,343,704, all of which are incorporated herein by reference, disclose ceramic foam filters for filtering molten metals, particularly molten aluminum. These ceramic foam filters include a foam structure which is prepared from an open cell, hydrophilic flexible foam material having a plurality of interconnected voids surrounded by a web of ceramic material. Typical foam materials which may be used include the polymeric foams such as polyurethane foams and the cellulosic foams. The foam structure is impregnated with a ceramic material which is able to withstand chemical attack by the particular molten metal. The ceramic material should also have sufficient structural and mechanical strength to withstand the required elevated temperature conditions. Typical ceramic materials which may be employed include alumina ($Al_2O_3$), chromia ($Cr_2O_3$), zirconia ($ZrO_2$), magnesia ($MgO$), titanium dioxide ($TiO_2$), silica ($SiO_2$), and mixtures thereof.

While ceramic filters and filtration systems using such ceramic filters are known in the art for filtering various kinds of molten metals, special problems are encountered in filtering molten iron.

When liquid iron passes through a ceramic filter, coarse impurities such as sand grains, small dross particles and non-dissolved seeding sites are removed from the melt on the entry side of the filter. Fine impurities, such as oxidation films and similar materials, deposit increasingly in the pores located within the filter. Thus, the coarse impurities are completely filtered out but the finely dispersed impurities are only partly removed. This problem may be alleviated somewhat by the use of fine-pored filters.

In iron melts containing magnesium, however, the numerous MgO and MgS slags present lead to a premature clogging of the filter. For this reason, the filter for manufacturing for example cast pieces of GGG, also known as nodular cast iron, must not be too fine-grained.

Furthermore, in casting iron melts which have a much higher temperature than aluminum melts, special requirements are placed on the filter in use. On the one hand, the filter must withstand the high temperatures until the mold is filled while maintaining a high rate of filtering. On the other hand, the filtration times must be adjusted to correspond to the piece to be cast. These requirements can be met by adjusting the specific filter surface, the pressure loss within the filter, and other parameters.

It is therefore an object of the present invention to provide a ceramic filter which is suitable for filtering molten cast iron.

It is also an object of the present invention to provide a method for filtering molten cast iron by means of a ceramic filter.

SUMMARY OF THE INVENTION

In accordance with the present invention, a ceramic filter made from a high-melting ceramic material and having an open-celled foam structure, a variable bulk density in different portions of the filter, and at least one afflux surface, for filtering molten cast iron is provided. The ceramic filter has a ratio of filter surface to filter volume in the range of about 0.0003 to 9 $m^2/cm^3$, a specific filter resistance in the range of about 0.1 to 0.9 bar-cm at a fluid flow of 5 $m^3$/hour, and a pressure loss $\Delta p$ across the filter which depends on the specific resistance of the filter $\rho$, the filter length L, and the surface area of the afflux plane F in accordance with the formula:

$$\Delta p \alpha \rho \times \frac{L}{F}.$$

Also in accordance with the present invention, a method for filtering molten cast iron is provided by placing the above-described ceramic filter near the bottom of a mold and pouring a mass of molten cast iron into the mold whereby the mass of molten cast iron first flows tangentially by the afflux plane of the ceramic filter before striking the bottom of the mold.

DETAILED DESCRIPTION OF THE INVENTION

Figure 1:
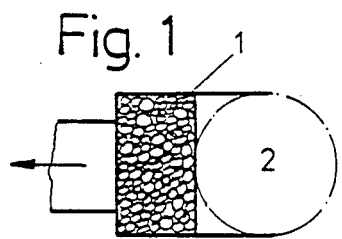
FIG. 1 shows a cross-sectional view of a feeder system with a ceramic filter in accordance with the present invention.

The ceramic filter of the present invention can be produced by various methods which are well known to those skilled in the art. For example, PCT/CH82/00048, published on Oct. 14, 1982, which is incorporated herein by reference, describes one particular method for producing a ceramic filter having an open-celled foam structure. In accordance with the method described therein, an aqueous ceramic slurry is first prepared. A large number of refractory materials can be used for producing the ceramic slurry. For example, alumina, silicon carbide, and silicon dioxide are all suitable ceramic materials. It is also desirable to include a highly fireproof inorganic binder, such as monoaluminum phosphate and/or monochromic phosphate in the ceramic slurry.

An open-cell foam structure made from an organic material is impregnated with the ceramic slurry. The organic material can be a reticulate foam on a polyester or polyethylene basis with a skeleton type net of cells of a three-dimensional structure. Other organic materials well known to those skilled in the art may also be suitably used.

Following a complete drenching or impregnation of the foam, the excess suspension is removed from the foam by leading the impregnate foam through a system of preset rollers. Thereafter, the foam is dried in order to remove the remaining water and the organic material is burned off. The removal of the water and the organic material may be accomplished by heating at temperatures in excess of, e.g., about 225° C. The ceramic filter is then calcined at temperatures between, e.g., about 1200° to 1500° C., or, preferably, between about 1350° to 1450° C.

In a preferred embodiment, the ceramic filter of the present invention comprises about 20–70% by weight of silicon carbide, about 10–40% by weight of alumina, about 2–20% by weight of silicon dioxide, and about 10–30% of an inorganic binder such as monoaluminum phosphate or monochromic phosphate. In an even more prefered embodiment, the ceramic filter contains about 30–60% by weight of silicon carbide, about 10–30% by weight of alumina, about 2–20% by weight of silicon dioxide, and about 10–30% of the inorganic binder.

In order to increase the thermal and mechanical stability of the ceramic filter, it is desirable that the bulk density of the outer portions of the ceramic filter be somewhat greater than the bulk density of the interior regions of the filter. Thus, the bulk density in the border areas may be about 1.2 to 10 times the bulk area of the interior regions of the filter. Such variations in the bulk density can be achieved mechanically, e.g., by surrounding the ceramic filter with a frame made from a refractory granular material which is set with an organic solvent or with a frame made from a metal. Alternatively, the variations in bulk density may be achieved by reimpregnating the surface of the already impregnated and dried ceramic filter with the ceramic slurry. The reimpregnation may be accomplished either by spraying or dipping. The reimpregnation step may be done either before or after calcining.

It has been found that in order to achieve reliable and efficient filtration of molten iron, several physical parameters of the ceramic filter must be coordinated. For example, in order to increase the melt flow from 1.3 to 5 cm³ of molten metal per cm² of filter plane per minute, the physical parameters, such as the specific filter surface the ratio of filter surface area to filter volume, and the pressure drop across the filter should be coordinated. Thus, in order to achieve optimal filtering of molten iron with the above described ceramic filter, the specific filter resistance should be in the range of about 0.1 to 0.9 bar-cm, most preferably about 0.4 bar-cm, the ratio of filter surface to filter volume should be in the range of about 0.0003 to 9 m²/cm³, preferably in the range of about 0.01 to 0.9 m²/cm³, and the pressure drop across the filter should depend on the specific filter resistance $\rho$, the length of the path through the filter L, and the surface area of the afflux plane F in accordance with the relationship $$\Delta p \alpha \rho \times \frac{L}{F}.$$

It is also desirable that the afflux plane have an open area portion or void fraction of about 35–95%, preferably about 70–95%, of the surface area of the afflux plane.

In addition, in order to achieve optimal filtration of molten iron, it is highly desirable to optimize the location of the filter in the casting system in order to take into account the flow data in the casting system. Thus, the ceramic filter preferably should be placed at a location proximate to where the kinetic energy of the incoming melt is greatest. It is also highly desirable to arrange for the incoming melt to flow tangentially by the afflux plane of the ceramic filter and then be deflected to create turbulence directly before the afflux plane of the filter.

Figure 3:
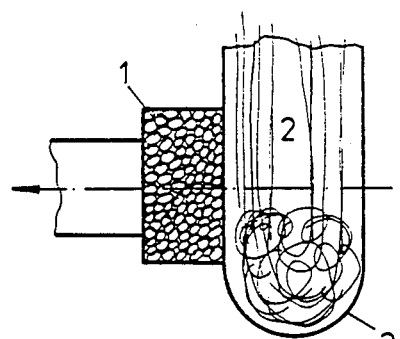
FIGS. 3 and 4 show longitudinal sections of the embodiments shown in FIGS. 1 and 2.

One particular embodiment of such an arrangement is illustrated in FIGS. 1 and 3 which show two different views of a feeder system for molten iron having a single ceramic filter. Ceramic filter 1 is located at the point in feeder 3 where the incoming melt 2 has the highest kinetic energy, i.e., near the bottom of feeder 3. Moreover, as can be seen in FIGS. 1 and 3, the incoming melt 2 is first caused to flow tangentially by the afflux plane of ceramic filter 1. The melt then strikes the bottom of feeder 3 and is deflected upward to create turbulence directly before the afflux plane of ceramic filter 1.

Feeder 3 is formed with a rounded bottom in such a way that the turbulence caused by the deflection of the flow of the melt 2 when it strikes the bottom does not become too great. This is desirable because if the turbulence is too strong, additional oxides might be formed in the melt. Also, if the turbulence is too strong, filter particles may be broken off from the surface of the afflux plane of the ceramic filter, resulting in additional non-metallic inclusions in the melt. On the other hand, a dampened turbulence directly in front of the afflux plane is advantageous because it increases the flow-through speed through the filter and permits filtration of a larger charge of the melt.

The larger charge of melt in the embodiment shown in FIGS. 1 and 3 is also attributable to the fact that in this arrangement the afflux plane of the ceramic filter is partially cleansed of coarse impurities by the continuous flow-by of the incoming melt. The continuous flow-by of the incoming melt acts as a continuous washing of the afflux side of the ceramic filter. Thus, premature clogging of the afflux side of the ceramic filter is prevented, permitting greater flow-through of the melt. In addition, the continuous washing of the afflux side of the ceramic filter, together with the turbulence created at the bottom of the feeder, helps to maintain the pressure drop across the filter by preventing clogging at the influx side of the filter. This too permits a larger charge of melt to be passed through the ceramic filter in a given amount of time.

Figure 2:
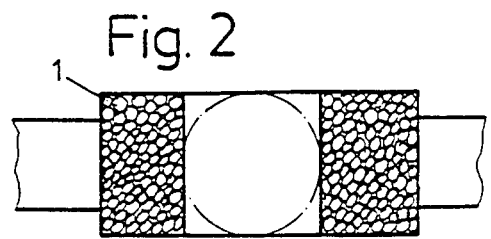
FIG. 2 shows a cross-sectional view of a second embodiment of the present invention.
Figure 4:
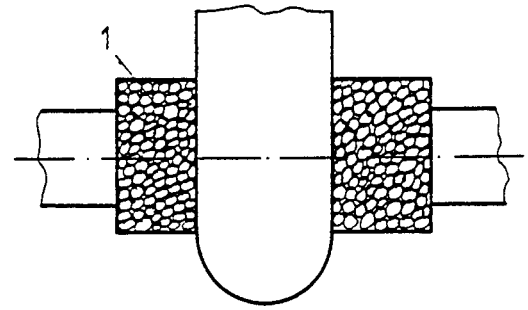

FIGS. 2 and 4 show a second embodiment of a filter system in accordance with the present invention. In this embodiment, two ceramic filters are located near the bottom of a feeder having a rounded bottom.

Figure 5:
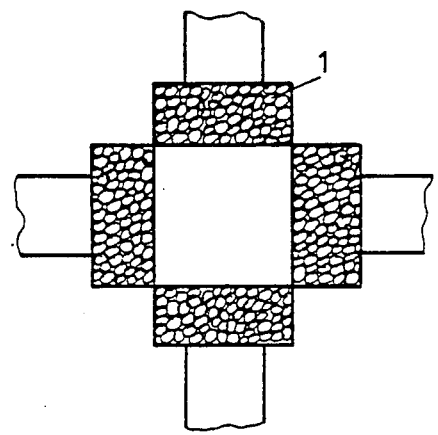
FIG. 5 shows a cross-sectional view of a third embodiment of the present invention.

FIG. 5 shows a third embodiment of the filter system of the present invention in which four ceramic filters are located near the bottom of a feeder having a rounded bottom.

Figure 6:
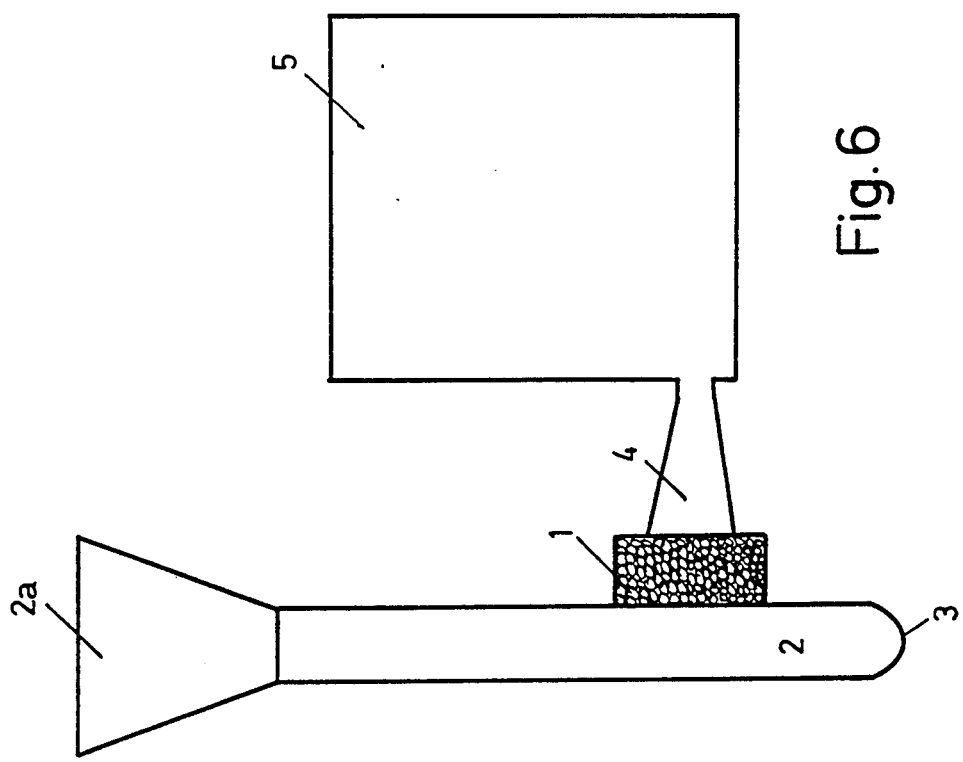
FIG. 6 shows a longitudinal sectional view of a fourth embodiment of the present invention.

FIG. 6 shows a fourth embodiment of a feeder system of the present invention. This embodiment is similar to that shown in FIGS. 1 and 3. The fluid iron is poured through inlet funnel 2a. and flows to bottom 3 past the inlet surface of filter 1. As the fluid iron reaches the level of filter 1, the fluid iron starts flowing through the filter 1 and fills the molding hollow compartment 5. Region 4 of the feeder system acts as a segment for communicating the melt 2 into compartment 5.

Figure 6A:
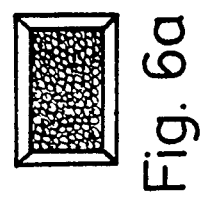
FIG. 6a shows a plan view of the ceramic filter in the feeder system of FIG. 6.

In the filling process itself, the open surface of the inflow area, i.e. the inlet surface of the filter, along with other influencing factors which have been described above, plays a substantial role. In order to increase the thermal and mechanical loading capacity of the filter, the filter may be reinforced in the border areas with a frame. This may, for example, be done through the use of a structural frame as shown in FIG. 6a. Other means for reinforcing the filter, such as frame-like stiffenings made of a fireproof, grained, and organically bonded raw material, may also be used.

Another method for increasing the weight per unit volume (bulk density) in the border areas of the filter is by the post-treatment of the filter with a ceramic slurry before or after calcining. This reimpregnation may be done, for instance, through spraying or immersion. In this manner, the pores in the border zones are filled so that, as with a structural frame, a frame-like enclosing will result.

Figure 7:
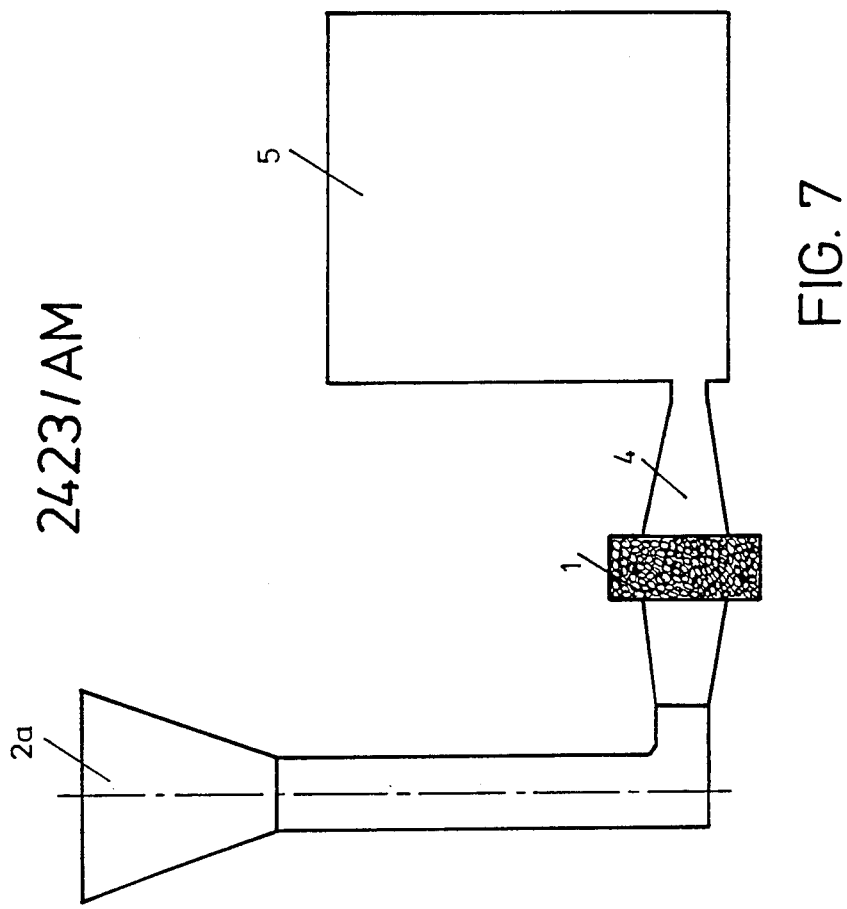
FIG. 7 shows a longitudinal sectional view of a fifth embodiment of the present invention.

FIG. 7 shows yet another embodiment of a feeder system of the present invention. In this feeder system, the fluid iron is poured into inlet funnel 2a and flows to the bottom of the feeder system and thereafter through region 4 into the molding compartment 5. As the fluid iron travels through region 4, it passes through filter 1.

In constructing the filter systems shown in the drawings, it is desirable that the afflux plane of the ceramic filter be oriented at an angle of 0° to 90°, preferably 0°–79°, most preferably about 0° as shown in FIGS. 1–6, to the direction of flow of the incoming melt.

Filtering iron alloys in accordance with the present teaching results in a simpler, more efficient and less costly casting system. Non-metallic impurities are reliably removed from the melt. In this way, a clear quality improvement is achieved in cast pieces.

To demonstrate the advantages achieved by the present invention, a ceramic filter 50×50×22 mm was prepared. The ceramic filter comprised 25% by weight alumina, 20% by weight of monoaluminum phosphate, and the balance silicon carbide. The ratio of the filter surface to the filter volume was 0.09 m²/cm³. This ceramic filter was placed in a feeder system similar to that shown in FIGS. 1 and 3 of the drawings and was used to filter molten cast iron. Excellent results were achieved.

Tests were also run with the same filter, except that there was a denser elutriation in the surface areas of the ceramic filter so that the bulk density was twice as great near the outside surfaces of the ceramic filter as in the interior. Again excellent results were obtained with the ceramic filter being able to withstand the high mechanical and thermal stress of liquid iron.

While the invention has been described with reference to specific examples, this was for purposes of illustration only and should not be construed to limit the spirit or the scope of the invention.

What is claimed is:

1. A ceramic filter made from a high-melting ceramic material and having an open-celled foam structure, with at least one afflux surface for filtering molten cast iron, said ceramic filter comprising an interior region surrounded by an outer region wherein the bulk density of the outer region of said ceramic filter is higher than the bulk density of the interior region of said ceramic filter, and wherein the ceramic filter has a ratio of filter surface to filter volume in the range of about 0.0003 to 9 m²/cm³, a specific filter resistance in the range of about 0.1 to 0.9 bar-cm at a fluid flow rate of 5 m³/hour, and a pressure loss $\Delta p$ across the filter which depends on the specific resistance $\rho$ of the filter, the filter length L, and the surface area of the afflux surface F in accordance with the relationship:

$$\Delta p \alpha \rho \times \frac{L}{F}$$

said ceramic material comprising 20–70% by weight of silicon carbide, 10–40% by weight of aluminum oxide, 2–20% by weight of silicon oxide, and 10–30% by weight of a refractory inorganic binder.

2. The ceramic filter of claim 1 wherein the refractory inorganic binder is selected from the group consisting of monoaluminum phosphate and monochromic phosphate.

3. The ceramic filter of claim 2 wherein said ceramic material comprises 30–60% by weight of silicon carbide and 10–30% by weight of alumina.

4. The ceramic filter of claim 1 wherein the ratio of the filter surface to filter volume is in the range of about 0.01 to 0.9 m²/cm³.

5. The ceramic filter of claim 1 wherein the afflux surface has a void fraction in the range of about 35–95%.

6. The ceramic filter of claim 1 wherein the afflux surface has a void fraction in the range of about 70–95%.

7. The ceramic filter of claim 1 wherein the bulk density in the outer region of the filter is about 1.2 to 10 times as great as the bulk density in the interior region of the filter.

8. The ceramic filter of claim 7 wherein the higher bulk density of the outer region of the filter is achieved by enclosing the filter within a frame.

9. The ceramic filter of claim 8 wherein the frame is made from a material selected from the group consisting of an organically set, refractory granular material and a metal.

10. A method for filtering molten iron which comprises:
   (a) providing a flowing mass of molten iron;
   (b) providing a ceramic filter made from a high melting ceramic material and having an open-celled foam structure with at least one afflux surface for filtering molten cast iron, said ceramic filter comprising an interior region surrounded by an outer region wherein the bulk density of the outer region of said ceramic filter is higher than the bulk density of the interior region of said ceramic filter, said ceramic material comprising 20–70% by weight of silicon carbide, 10–40% by weight of aluminum oxide, 2–20% by weight of silicon oxide, and 10–30% by weight of a refractory inorganic binder,
   (c) positioning said ceramic filter in a casting system near the location where the molten iron has its highest kinetic energy; and
   (d) causing the mass of molten iron to flow tangentially by the afflux surface of said ceramic filter and creating turbulent flow in front of the afflux plane of said ceramic filter thereby causing the mass of molten iron to pass through said ceramic filter.

11. The method of claim 10 wherein the mass of molten iron is first caused to flow tangentially by the afflux surface of the filter in a direction essentially parallel to the afflux surface and then is deflected to create turbulence directly in front of the afflux surface.

12. The method of claim 10 wherein the afflux surface is oriented at an angle which is in the range of about 0° to 90° to the direction of flow of the molten mass of iron.

13. The method of claim 12 wherein the angle of orientation is in the range of about 0°–79°.

14. The method of claim 13 wherein the angle of orientation is about 0°.

15. The method of claim 10 wherein the pressure loss across the filter during a casting process is maintained.

16. A method for filtering molten iron which comprises:
(a) providing a flowing mass of molten iron;
(b) causing said flowing mass of molten iron to pass through a ceramic filter while creating turbulent flow in front of the ceramic filter wherein said filter is made from a high-melting ceramic material and has an open-celled foam structure, and at least one afflux surface, an outer region of said ceramic filter surrounding an interior region of said ceramic filter, the bulk density of the outer region of said ceramic filter being higher than the bulk density in the interior region of said ceramic filter, said ceramic material comprising 20–70% by weight of silicon carbide, 10–40% by weight of aluminum oxide, 2–20% by weight of silicon oxide, and 10–30% by weight of a refractory inorganic binder, said ceramic filter having a ratio of filter surface to filter volume in the volume in the range of about 0.0003 to 9 m$^2$/cm$^3$, a specific filter resistance in the range of about 0.1 to 0.9 bar-cm at a fluid flow rate of 5 m$^3$/hour, and a pressure loss $\Delta p$ across the filter which depends on the specific resistance $\rho$ of the filter, the filter length L, and the surface area of the afflux plane F in accordance with the relationship $$\Delta p \alpha \rho \times \frac{L}{F}.$$

17. A ceramic filter made from a high-melting ceramic material and having an open-cell foam structure, with at least one afflux surface, said ceramic filter comprising an interior region surrounded by an outer region, wherein the bulk density of the outer region of said ceramic filter is higher than the bulk density of the interior region of said ceramic filter, said ceramic material comprising 20–70% by weight of silicon carbide, 10–40% by weight of aluminum oxide, 2–20% by weight of silicon oxide, and 10–30% by weight of a refractory inorganic binder.

18. The ceramic filter of claim 17 wherein the bulk density in the outer region of said ceramic filter is about 1.2 to 10 times higher than the bulk density in the interior region of said ceramic filter.

* * * * *